(12) United States Patent
Yoakim et al.

(10) Patent No.: US 7,216,582 B2
(45) Date of Patent: May 15, 2007

(54) PERCOLATING DEVICE

(75) Inventors: Alfred Yoakim, St-Legier-la-Chiesaz (CH); Petr Masek, Granges (CH)

(73) Assignee: Nestec S.A., Vevey (CH)

( * ) Notice: Subject to any disclaimer, the term of this patent is extended or adjusted under 35 U.S.C. 154(b) by 278 days.

(21) Appl. No.: 10/445,879

(22) Filed: May 28, 2003

(65) Prior Publication Data

US 2004/0031394 A1    Feb. 19, 2004

Related U.S. Application Data

(63) Continuation-in-part of application No. PCT/EP01/13544, filed on Nov. 20, 2001.

(30) Foreign Application Priority Data

Nov. 28, 2000    (EP)    ................................ 00125972

(51) Int. Cl.
*A47J 31/40*    (2006.01)
(52) U.S. Cl. ...................... 99/295; 99/289 R; 99/302 P
(58) Field of Classification Search ................ 99/295, 99/289 R, 289 P, 302 R, 302 P
See application file for complete search history.

(56) References Cited

U.S. PATENT DOCUMENTS 5,762,987 A * 6/1998 Fond et al. .................. 426/433
6,026,732 A 2/2000 Kollep et al. ................. 99/295
6,499,388 B2 * 12/2002 Schmed ........................ 99/295
6,557,458 B1 5/2003 Blanc et al. .................. 99/280

FOREIGN PATENT DOCUMENTS

| DE | 299 15 025 U1 | 1/2000 |
| FR | 2 617 389 | 6/1987 |
| WO | 0038558 * | 6/2000 |
| WO | WO0064318 | 11/2000 |

* cited by examiner

*Primary Examiner*—Reginald L. Alexander
(74) *Attorney, Agent, or Firm*—Bell, Boyd & Lloyd LLP

(57) ABSTRACT

Percolating device, for example intended to equip a coffee machine, comprising a percolating chamber mounted in such a way that it can carry out a displacement in the vertical direction when a control handle is operated. A cap receiving a capsule of product to be infused is also displaced, when the handle is operated, towards the inside of the percolating chamber. A percolating head sliding freely inside the percolating chamber can occupy different relative positions inside the percolating chamber according to the size of the capsule loaded into the cap. A stop device makes it possible to lock the percolating head in a definite position in order to inject steam and/or water through the percolating head.

15 Claims, 4 Drawing Sheets

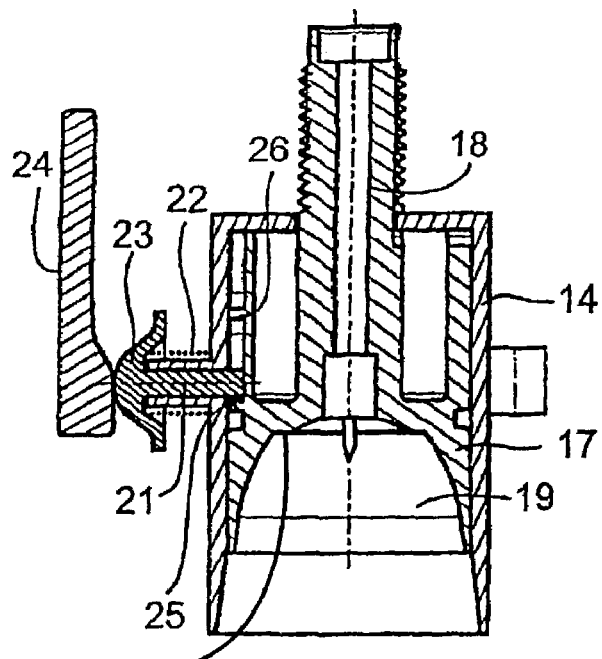
FIG. 7
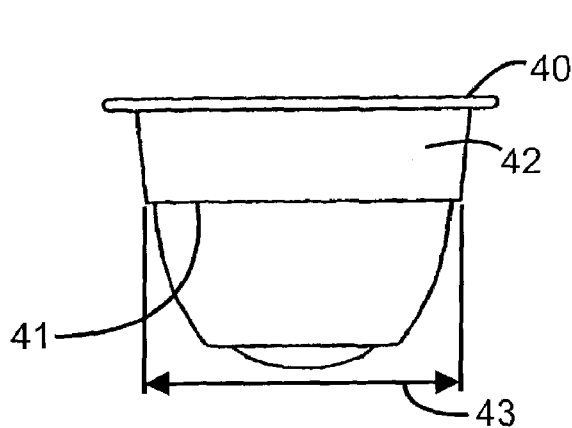
FIG. 8　　　FIG. 9
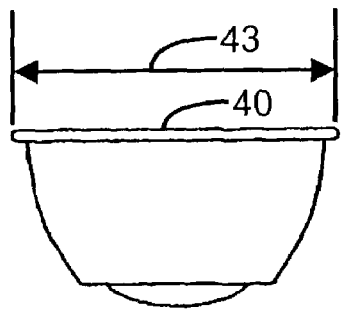　　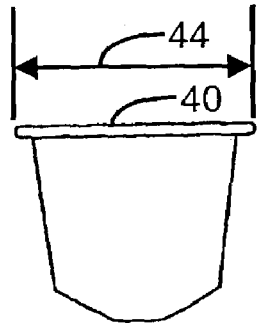
FIG. 10　　　FIG. 11

PERCOLATING DEVICE

CROSS-REFERENCE TO RELATED APPLICATIONS

This application is a continuation-in-part of International Application No. PCT/EP01/13544, filed on Nov. 20, 2001, the content of which is hereby expressly incorporated herein by reference thereto.

FIELD OF THE INVENTION

The present invention relates to a percolating device intended to be used in a machine for preparing hot drinks, such as coffee, for example. More particularly, the invention relates to a percolating device for espresso-type machine that use doses of coffee or of another substance packaged in capsules. The invention also relates to the capsules used in the percolating device.

BACKGROUND OF THE INVENTION

Known coffee machines generally comprise a cap intended to receive a capsule containing a dose of the drink to be infused. The cap is taken, manually or automatically, to a percolating head comprising a bored needle, which allows the injection of water and/or of steam into the capsule.

One of the disadvantages of the existing machines is the fact that it is not possible to adapt the concentration of the drink prepared as the capsules all contain the same dose of the product to be infused. The only parameter which the user can vary is the quantity of water injected into the capsule. Thus, if the user desires a concentrated drink in a cup of large capacity, he will have to use two capsules of product in succession in order to obtain the desired concentration.

SUMMARY OF THE INVENTION

The invention relates to a device for preparing a food product from a capsule, and can be a percolating device or other extraction device. The preferred embodiment of the device has a percolating assembly with a holding portion and a percolating head. The percolating head is movable within the holding portion between at least first and second positions. The percolating assembly defines a percolating chamber adjacent to percolating head. When the percolating head is in the first position, the percolating chamber has a first configuration to contain a capsule with first dimensions. When the percolating head is in the second position, the percolating chamber has a second configuration for containing a capsule having second dimensions, which are larger than the first dimensions. Additionally, a fluid inlet is associated with a percolating chamber for feeding a fluid into the capsule for preparing the food product. Preferably, the percolating head is movable axially within the holding portion of the percolating assembly between the first and second positions.

A loading member can be configured for receiving the capsule. The loading member has a loading position substantially in alignment with the percolating assembly. In this embodiment, the percolating assembly is movable generally axially toward the capsule that is in the loading member, which is in the loading position, to receive the capsule in the percolating chamber. Also, the percolating assembly is perfectly configured for automatically positioning the percolating head in the first or second position, corresponding to the dimensions of the capsule. The loading member can be movably associated with the percolating assembly for moving generally radially with respect thereto to the loading position. A control member, operable by a user, is associated with the loading member and the percolating assembly for moving the loading member to the loading position, which movement preferably includes an axial movement with respect to the percolating assembly to position the capsule in the percolating chamber. To obtain these motions, the device is preferably provided with a frame that has a track configured to guide the loading member along a path having a generally radial portion of the generally axial portion with respect to the percolating assembly. The preferred loading member is configured for extracting a mixture of the fluid and substance from the capsule for preparing a food product, and may also comprise an extraction lug configured to extract the capsule from the percolating chamber when the percolating chamber is open.

A stop member may be configured for automatically stopping the percolating head in the first and second positions, depending on the dimensions of the cartridge received in the percolating chamber. The device can include a stop that is cammingly associated with a cam follower of the stop member for moving the cam follower to a stopping position to stop the percolating head with respect to the holding portion in either the first or second positions. To achieve this, the percolating head can comprise at least one rib that is associable with the cam follower in the stopping position.

The preferred embodiment additionally has a food product extraction device that is configured for opening the cartridge to outlet a mixture of the fluid and the substance from the cartridge to prepare the food product. Additionally, a recessed portion of the percolating head preferably substantially defines the percolating chamber when the percolating head is in the first position. When the percolating head is in the second position, the recessed portion and preferably part of the holding portion define the percolating chamber. The percolating chamber has a loading opening that is preferably sealed against the loading member and/or the cartridge during infusion, and a portion of the percolating chamber adjacent the loading opening is wider with the percolating head in the second position than in the first position. Preferably, when the percolating head is in the second position, it defines a shoulder location along the axial height of the percolating chamber for receiving a corresponding shoulder of the capsule having the second dimensions. This shoulder is preferably disposed between about one-half and one-quarter of the axial height from one of the axial ends of the percolating chamber in the second configuration, and most preferably about a third of the axial height from the loading opening.

In the preferred embodiment, the capsule of the first dimension contains a dose of substance to mix with the fluid to prepare a food product, while the capsule of the second dimension has about between 1.5 and 3 doses thereof, and preferably a double dose thereof. The relative volumes of the capsules of the first and second dimensions are preferably positioned to the dosage contained therein. The percolating chamber and the fluid inlet are preferably configured for infusing the substance within the cartridge to prepare the food product, and the preferred embodiment of the invention is a hot drink dispenser.

In an embodiment of a method according to the present invention, a food product is prepared by closing a percolating assembly by a cartridge that has other first and second dimensions, and displacing a percolating head of the percolating assembly by action of the cartridge, such as when the cartridge abuts and displaces the percolating head. This configures the percolating chamber according to the dimensions of the cartridge. A fluid is fed into the cartridge, and a mixture of the fluid and a substance from the cartridge is extracted therefrom to prepare a food product. Preferably the food product is a beverage, and preferably the percolating head is stopped at a first or second position to configure the percolating chamber as desired.

BRIEF DESCRIPTION OF THE DRAWINGS

The percolating device that is the subject of the invention will now be described with reference to the accompanying drawings which show, by way of non-limitative example, an embodiment of the percolating device.

FIG. 7 is a cross-sectional view similar to that of FIG. 5, in a position assumed when a large-sized capsule is loaded in the percolating chamber;

FIG. 8 is a side view of a first embodiment of a capsule containing a double dose of coffee;

FIG. 9 is a side view of a second embodiment of a capsule containing a double dose of coffee; and FIGS. 10 and 11 respectively show two embodiments of capsules having similar shapes as the capsules shown in FIGS. 8 and 9, but whose capacity is adapted to receive a single dose of coffee.

DETAILED DESCRIPTION OF THE PREFERRED EMBODIMENTS

The present invention provides a percolating device that operates with capsules of different capacity and dimensions, without the user having to carry out special operations depending on the type of capsule used. For this purpose, an embodiment has capsules equipping the machine, preferably made of aluminum, and whose capacity is variable in accordance with the desired concentration of the drink and a percolating device. The percolating device has a percolating chamber mounted in such a way that it is operable to be displaced in a direction that is preferably in the vertical plane, when a control device is operated, to receive a capsule of product to be infused. A percolating head is mounted such that it slides axially inside the percolating chamber. A stop device is provided to lock the percolating head in the percolating chamber in a position selected corresponding to the size of the capsule used.

Figure 1:
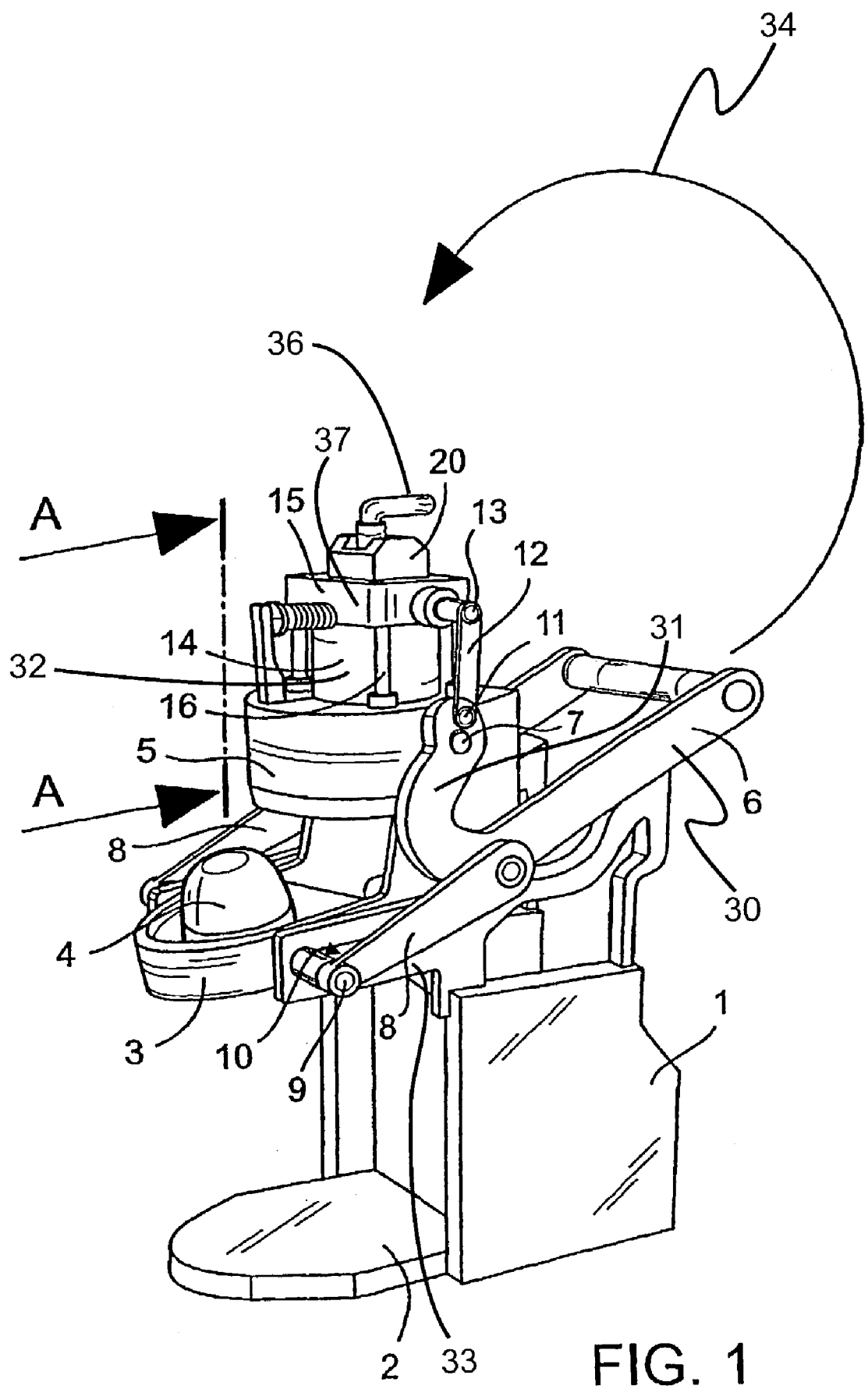
FIG. 1 is a diagrammatic illustration in perspective of the body of a coffee machine equipped with a percolating device according to the invention, the machine being in the position of loading a coffee capsule.

With reference to FIG. 1, the frame 1 of the machine for preparing hot drinks includes a base 2 for receiving a receptacle intended for receiving the infused drink. The upper part of the frame 1 has a mechanism making it possible to bring a loading cap 3 receiving a capsule 4, which contains a dose of the product to be infused, opposite a percolating end-piece 5. This mechanism is operated by means of a control handle 6 pivoted in the frame about a spindle 7. The control handle 6 of the embodiment shown is J-shaped, having a straight section 30 extended by a curved section 31. The handle 6 is connected to the cap 3 by way of two rods 8 connected at spindles 9, which slide freely in a track, such as slots 10 formed in side members 33 of the frame 1. Slots 10 have a generally horizontal portion 46, and a generally upright portion 47 that is curved to preferably move the cap 3 substantially axially with respect to the percolating assembly 14.

Figure 2:
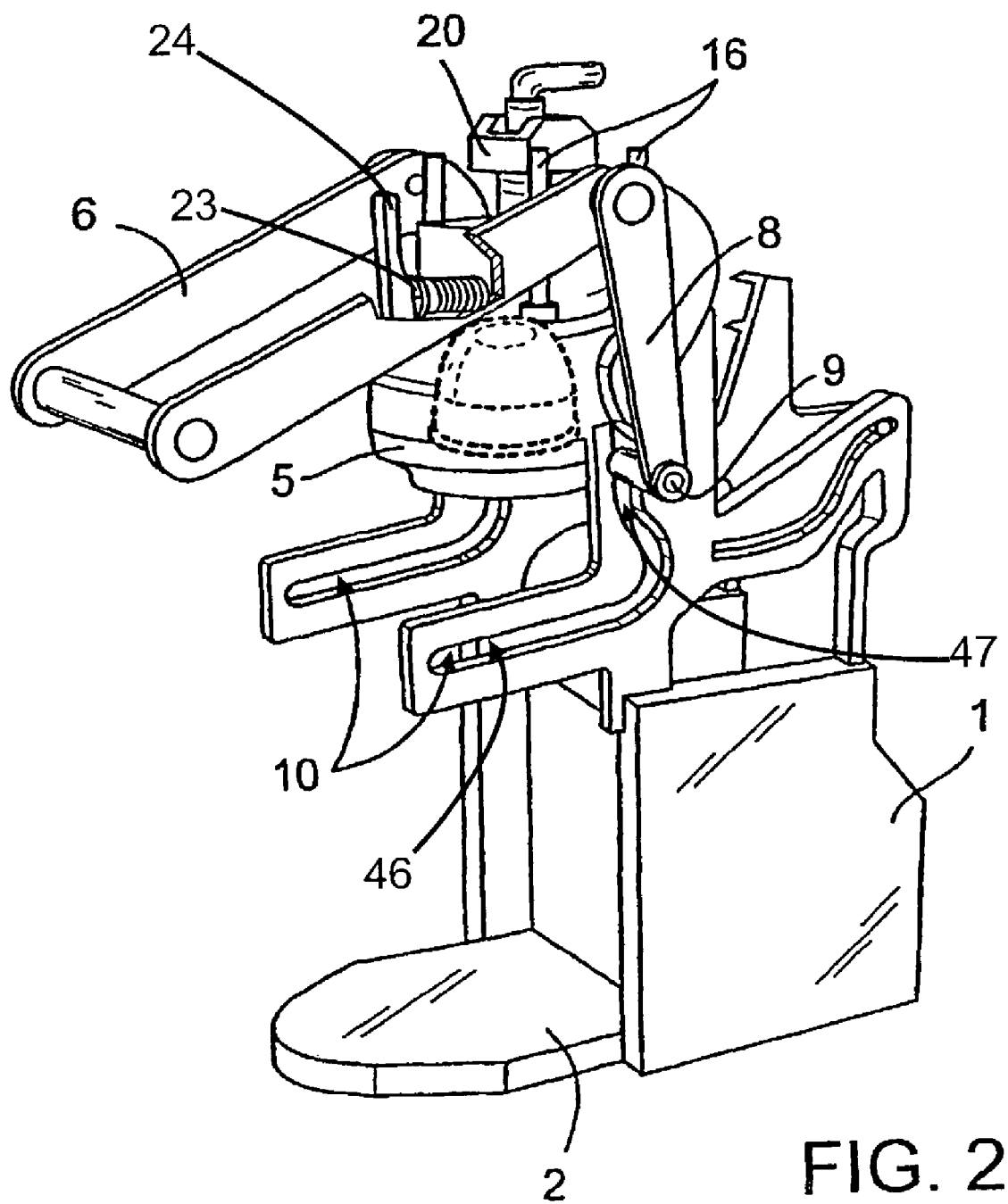
FIG. 2 is a view similar to that of FIG. 1, the dose of coffee contained in the capsule being in the operating position ready to be infused.
Figure 3:
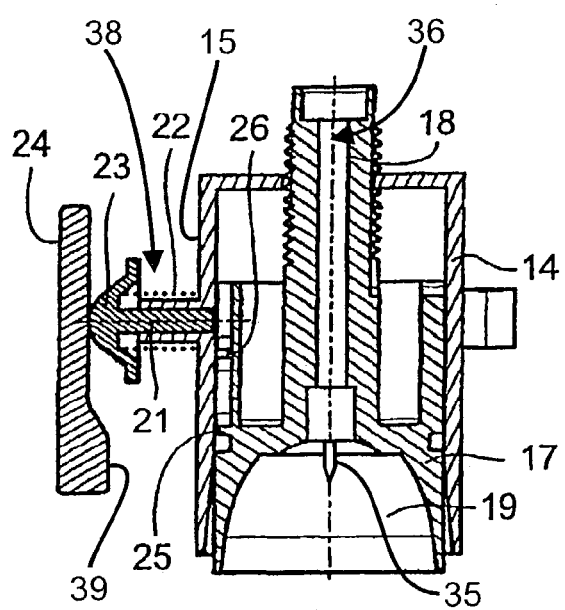
FIG. 3 is a cross-sectional view of the percolating device through the line A—A of FIG. 1, the device being in the position of rest.

During the travel of the handle, the cap 3 carrying the capsule 4 is brought progressively below the percolating end-piece 5 into alignment therewith. At the end of the travel, as shown in FIG. 2, the capsule 4 is inserted into percolating chamber assembly 14, which is described below, and the cap 3 is maintained in a fluid-tight association against the percolating end-piece 5.

The curved end 31 of the control handle 6 is also connected by spindles 11 to two rods 12 attached by spindles 13 to the upper part of the percolating chamber assembly 14. The percolating chamber assembly 14 of the embodiment shown includes a holding member or part 15 with a cylindrical section 32 integral with a portion 37 having a square shape at an upper portion.

The four corners of the holding part 15 are pierced with holes such that the percolating chamber assembly 14, holding part 15 can slide up markdown, guided by spindles 16 integral with the frame. In this way, the percolating chamber 14 of the embodiment shown carries out a movement in the vertical plane when the control handle 6 is operated, the part 15 being driven by the control handle 6 by the way of the rods 12 and the spindles 13.

Thus, because of this double kinematic link, the control handle 6, during a movement in the direction of arrow 34, progressively brings the cap 3 below the percolating end-piece lowering the percolating chamber assembly 14 in such a way as to receive the capsule 4 containing the product to be infused. The end of the travel is illustrated in FIG. 2 which shows the device in the operating position, ready to infuse the drink. In this position, the capsule 4 is located inside the percolating chamber assembly 14 and the cap 3 is held against the percolating end-piece in a fluid-tight manner.

Other mechanical devices can furthermore be envisaged for allowing the displacement of the cap 3 from a loading position to an operating position inside the percolating chamber, the latter having carried out a movement preferably from a high position to a low operating position.

The rear part of the cap 3 has two extraction lugs located at the end of uprights. During the opening of the mechanism by a movement of the control handle 6 in the direction opposite to that of the arrow 34, the extraction lugs are brought to the proximity of the periphery of the percolating chamber containing the capsule and thus making it possible, by pressing the base of the capsule, to extract it into a container located in the rear section of the frame 1. When using a cartridge whose dimensions correspond to those of the percolating head described below, the upper extraction lugs will make it possible to extract the capsule. When using bigger capsules, that is to say capsules whose dimensions exceed those of the percolating chamber, it is the lower extraction lugs that interact with the rim forming the base of the capsule in order to extract it from the chamber.

Referring to FIGS. 3–7, the percolating chamber assembly 14 comprises a percolating head 17 mounted slide inside the cylindrical portion 32 of the percolating chamber assembly 14. The percolating head 17 of this embodiment comprises a hollow cylindrical rod 18 whose upper end slides freely in a hole formed in the part 15 of the percolating chamber 14. The lower part of the percolating head 17 has a diameter substantially equal to that of the interior of portion 32 percolating chamber 14 and has an recess 19 dimensioned shaped to correspond to the shapes of the capsules containing the product to be infused and, preferably have a bell shape. At the center of the recess 19, there is a piercing member, which in this embodiment is a needle 35, whose downward-directed point is disposed or configured to pierce the top part of the capsule to inject a fluid, preferably water and/or steam, into the capsule through the water inlet pipe 36 formed in the rod 18. The travel of the percolating head 17 is limited in its axial displacement by an end-piece 20 integral with the rod 18 and emerging from the holding part 15. The intake of water or steam takes place by the intermediary of a water feed pipe provided on the part 20.

A stop device 38 limiting the axial travel of the percolating head 17 is incorporated in the holding part 15 of the percolating chamber assembly 14. This stop device comprises a rod 21 sliding horizontally against the action of a spring 22 in a tube emerging into an recess formed in the holding part 15 of the percolating head assembly 14. Rod 21 is terminated by a cam follower head 23, which is pushed by the action of the spring 22 against a cam 24 integral with the frame 1. The cam 24 has, in its lower section, a projecting part 39 that comes into contact with the head 23 of the stop device when, due to the operation of the control handle 6, the percolating chamber assembly 14 is brought into the low position.

Thus, during the vertical displacement of the percolating chamber 14, the rod 21 of the stop device 38 penetrates into the part 15 of the percolating chamber when the head 23 comes into contact with the projecting part 39 of the cam 24.

The function of this stop device 38, with members 21–24 is to lock the percolating head 17 in a position when the percolating chamber assembly 14 is in the operating position at the end of travel of the control handle shown in FIG. 2. For this purpose, the outer surface of the percolating head has a longitudinal groove interrupted by two annular ribs 25 and 26 that cooperate with the end of the rod 21 according to the relative position of the percolating head 17 inside the percolating chamber 14. Preferably, the percolating head 17 is locked by the rod 21 of the locking cam follower preventing movement of the percolating head 17 with respect to the holding portion 15 in a direction to expand the size of the percolating chamber, although in one embodiment, movement of the percolating head 17 is stopped in both directions.

Figure 4:
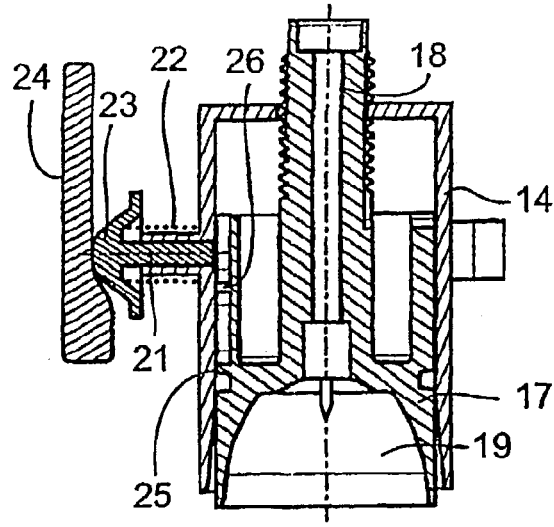
FIG. 4 is a cross-sectional view similar to that of FIG. 3 in an intermediate position assumed when a small-sized capsule is inserted into the percolating device.
Figure 5:
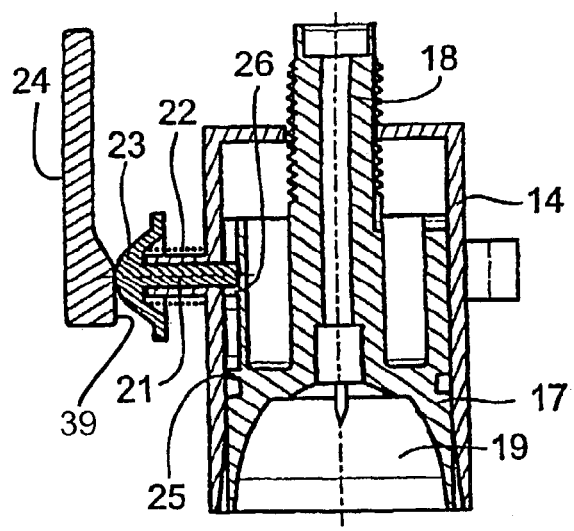
FIG. 5 is a view identical to that of FIG. 4, the percolating device being at the end of its travel and ready for use.
Figure 6:
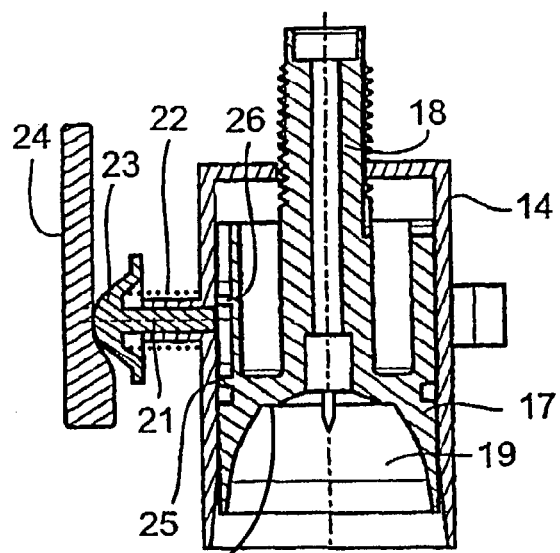
FIG. 6 is a cross-sectional view similar to that of FIG. 4, in a position assumed when a large-sized capsule is inserted into the device.

The functioning of the percolating head 1 will now be described with reference to FIGS. 4 to 7. FIGS. 4 and 5 show the percolating device in two different positions when it is loaded with a capsule of standard dimensions and configuration such as those illustrated in FIGS. 10 and 11. The capsules shown in FIGS. 10 and 11 have dimensions that correspond to those of the bell-shaped recess 19 of the percolating head 17 and are generally provided for containing a single dose of the product to be infused. FIGS. 6 and 7 are views similar to those shown in FIGS. 4 and 5, but showing the device when loaded with a capsule such as shown in FIG. 8 or 9. The capsules of FIGS. 8 and 9 show two embodiments of capsules sized to contain a double dose of product to be infused. It will be noted that these capsules have a base 40 whose diameter is greater than that of the capsules shown in FIGS. 10 and 11 and have a shoulder 41 adjacent an expended portion 42, which can be located at about one third of their height from the base 40. The diameter 43, 44 at the level of the shoulder of the capsules shown in FIGS. 8 and 9 is substantially the same as that of the base of the capsules shown in FIGS. 10 and 11.

FIG. 4 shows the percolating device in a position close to the one shown in FIG. 2, which is practically at the end of the travel of the handle 6, when a standard-sized capsule has been loaded into the cap 3. The percolating head 17 is in the low position and, as the capsule has dimensions corresponding to those of the recess 19, preferably substantially no force is applied against the percolating head 17 which, consequently, is not displaced upwards beyond the position shown, or at all in some embodiments. When the handle 6 reaches the end of its travel, referring to FIG. 5, the protruding part 39 of the cam 24 applies a pressure on the head 23 and forces the rod 21 inside part 15 of the percolating chamber assembly 14. In this position, the rod 21 is located above the upper rib 26 of the percolating head 17 and thus locks the percolating head 19 in the low position against the cap in such as way as to allow the piercing of the capsule and the injection of water and/or of steam, into the capsule.

FIGS. 6 and 7 are views similar to those of FIGS. 4 and 5 when a capsule of double capacity, such as those shown in FIG. 8 or 9, is inserted in the cap 3. The capsule, because of its size, comes into contact with the upper end 45 of the recess 19 and pushes the percolating head 17 upwards. The axial displacement of the percolating head 17 is possible because it slides freely and axially in the embodiment shown inside holding part 15 of the percolating chamber assembly 14, the rod 21 not yet having penetrated into the chamber 14.

At the end of its travel, as shown in FIG. 7, the percolating head 17 occupies a high position in the chamber 14 and the rod 21 is in contact with the lower rib 25 of the percolating head 17, thus stopping upward displacement of the percolating head 17. In this position, the percolating head 17 is bearing on the shoulder 41 of the capsule, obtaining the desired fluid-tightness during the injection of water or of steam.

Because of the fact that the percolating head 17 is mounted in such a way as to be able to slide freely inside the percolating chamber, its relative position with respect to the chamber varies depending on whether a cartridge of standard size or a cartridge of double capacity is inserted into the cap 3. The locking device 38 actuated at the end of travel by the cam 24 cooperates with one of the ribs 25 or 26 to lock the percolating head 17 in holding part 15 in a predetermined position corresponding to the type of capsule used, thus allowing the injection of water or steam. This percolating device makes it possible to use at least two types of capsules of different capacity and volume without the user having to carry out specific operations according to the type of capsule inserted in the cap 3. In variants, it is possible to make provision for the percolating head to have more than two ribs cooperating with the rod 21 of the stop device in order to be able to accept capsules of intermediate sizes. In one variant, the annular ribs 25 and 26 can be replaced by simple stop-pieces.

When the percolating assembly 14 is closed with that capsule held between the percolating head 17 and the cap 3, a fluid, such as water or steam, is injected into the cartridge to infuse the food product therein, and the mixture of the fluid and all or a substance of the cartridge product is extracted from the cartridge. This mixture is preferably a food, and most preferably a beverage, such as coffee. The device also preferably has a portion configured for opening the cartridge in the chamber to release the mixture, and this portion can comprised raised and hollow portions configured to pierce the lid of the cartridge, as known in the art. In this manner, the mixture is outlet to the receptacle disposed in the receptacle receiving area which in the embodiment shown is disposed on the base 2.

Other embodiments, including, for instance, other configurations of the stop device to limit the travel of the percolating head inside the chamber and other numbers of positions the head may be stopped, can be envisaged without departing from the scope of the invention as defined in the claims.

What is claimed is:

1. A device for preparing a food product from a capsule, comprising:
    a percolating assembly that comprises:
        a holding portion,
        a percolating head movable within the holding portion between at least first and second positions, wherein the percolating assembly defines a percolating chamber adjacent the percolating head having:
            a first configuration for containing a capsule having first dimensions with the percolating head in the first position, and
            a second configuration for containing a capsule having second dimensions larger than the first dimensions with the percolating head in the second position;
        a fluid inlet associated with the percolating chamber for feeding a fluid into the capsule for preparing the food product; and
        a loading member configured for receiving the capsule and having a loading position substantially axially aligned with the percolating assembly, wherein the percolating assembly is movable generally axially toward the capsule in the loading member in the loading position to receive the capsule in the percolating chamber, and the percolating assembly configured for automatically positioning the percolating head in the first or second position corresponding to the dimensions of the capsule.

2. The device of claim 1, wherein the loading member is movably associated with the percolating assembly for moving generally radially with respect thereto to the loading position.

3. The device of claim 2, further comprising a control member operable by a user and associated with the loading member and the percolating assembly for moving the loading member to the loading position and axially with respect to the percolating assembly to position the capsule in the percolating chamber.

4. The device of claim 2, further comprising a frame with a track configured to guide the loading member along a path having a generally radial portion and a generally axial portion with respect to the percolating assembly.

5. A device for preparing a food product from a capsule, comprising:
    a percolating assembly that comprises:
        a holding portion,
        a percolating head movable within the holding portion between at least first and second positions, wherein the percolating assembly defines a percolating chamber adjacent the percolating head having:
            a first configuration for containing a capsule having first dimensions with the percolating head in the first position, and
            a second configuration for containing a capsule having second dimensions larger than the first dimensions with the percolating head in the second position, wherein the percolating assembly comprises a stop member configured for automatically stopping the percolating head in the first or second position depending on the dimensions of the cartridge received in the percolating chamber; and
        a fluid inlet associated with the percolating chamber for feeding a fluid into the capsule for preparing the food product.

6. The device of claim 5, further comprising a stopping cam, wherein the stop member comprises a cam follower in cammed association with the stopping cam for moving to a stopping position to stop the percolating head with respect to the holding portion in the first or second position.

7. The device of claim 6, wherein percolating head comprises at least one rib that is associable with the cam follower in the stopping position.

8. A device for preparing a food product from a capsule, comprising:
    a percolating assembly that comprises:
        a holding portion,
        a percolating head movable within the holding portion between at least first and second positions, wherein the percolating assembly defines a percolating chamber adjacent the percolating head having:
            a first configuration for containing a capsule having first dimensions with the percolating head in the first position, and
            a second configuration for containing a capsule having second dimensions larger than the first dimensions with the percolating head in the second position, wherein the percolating chamber has a loading opening to receive the cartridge, and a portion of the percolating chamber adjacent the loading opening is wider with the percolating head in the second position than in the first position and wherein when the percolating head is in the second position, the percolating head defines a shoulder in the axial height of the percolating chamber for receiving a corresponding shoulder of the capsule having the second dimensions; and
        a fluid inlet associated with the percolating chamber for feeding a fluid into the capsule for preparing the food product.

9. The device of claim 8, wherein the shoulder is disposed at between about one half and one quarter from one of the axial ends of the percolating chamber with the percolating head in the second position.

10. A device for preparing a food product from a capsule, comprising:
    a percolating assembly that comprises:
        a holding portion,
        a percolating head movable within the holding portion between at least first and second positions, wherein the percolating head is movable axially within the holding portion between the first and second positions and wherein the percolating assembly defines a percolating chamber adjacent the percolating head having:
            a first configuration for containing a capsule having first dimensions with the percolating head in the first position, and a second configuration for containing a capsule having second dimensions larger than the first dimensions with the percolating head in the second position;

a fluid inlet associated with the percolating chamber for feeding a fluid into the capsule for preparing the food product; and a loading member configured for receiving the capsule and having a loading position substantially axially aligned with the percolating assembly, wherein the percolating assembly is movable generally axially toward the capsule in the loading member in the loading position to receive the capsule in the percolating chamber, the percolating head bearing on a shoulder of the capsule for automatically positioning in the first or second position corresponding to the dimensions of the capsule.

11. The device of claim 10, wherein the loading member is movably associated with the percolating assembly for moving generally radially with respect thereto to the loading position.

12. The device of claim 11, further comprising a control member operable by a user and associated with the loading member and the percolating assembly for moving the loading member to the loading position and axially with respect to the percolating assembly to position the capsule in the percolating chamber.

13. The device of claim 11, further comprising a frame with a track configured to guide the loading member along a path having a generally radial portion and a generally axial portion with respect to the percolating assembly.

14. The device of claim 10, wherein the loading member is configured for extracting a mixture of the fluid and a substance from the capsule for preparing the food product.

15. The device of claim 10, wherein the loading member comprises an extraction lug configured for extracting the cartridge from the percolation chamber when the percolation chamber is opened.

* * * * *